United States Patent [19]

Jameikis et al.

[11] 4,290,237

[45] Sep. 22, 1981

[54] FIXTURE FOR USE IN FORMING CYLINDRICAL SURFACES OF ACCURATE DIMENSION

[75] Inventors: Saulius M. Jameikis, Riviera Beach; Robert K. Stalcup, North Palm Beach Gardens; Joe F. Arnold, North Palm Beach; Robert K. Hon, West Palm Beach, all of Fla.

[73] Assignee: United Technologies Corporation, Hartford, Conn.

[21] Appl. No.: 99,062

[22] Filed: Nov. 30, 1979

[51] Int. Cl.³ .............................................. B24B 5/04
[52] U.S. Cl. ................................. 51/34 A; 51/100 R; 51/216 LP; 409/164; 409/199
[58] Field of Search ............... 51/34 A, 34 E, 98 R, 51/100 R, 127, 216 LP, 216 A; 409/109–112, 145, 164, 168, 199, 224; 269/60, 61, 75

[56] References Cited

U.S. PATENT DOCUMENTS

| | | | |
|---|---|---|---|
| 1,282,037 | 10/1918 | Bugbee | 51/216 A |
| 1,434,131 | 10/1922 | Lutz | 51/98 R |
| 2,162,044 | 6/1939 | Wilson | 51/100 R |
| 2,320,672 | 6/1943 | Stein | 51/100 R X |
| 2,378,912 | 6/1945 | Collins | 269/61 |
| 3,273,879 | 9/1966 | Floren | 269/61 |
| 3,469,497 | 4/1969 | McCann | 409/168 |
| 4,038,783 | 8/1977 | Rosenthal | 51/100 R X |
| 4,061,077 | 12/1977 | Gladwin | 409/199 |
| 4,135,333 | 1/1979 | Stith | 51/58 X |

*Primary Examiner*—Gary L. Smith
*Attorney, Agent, or Firm*—Robert C. Walker

[57] ABSTRACT

A fixture capable of accurately manipulating a workpiece through a circular arc is provided. Various concepts useful in the formation of a cylindrical surface on the workpiece are developed. One fixture described includes a pair of opposing spherical surfaces which are restricted in degree of movement by a key extending from one surface into a slot in the opposing surface.

4 Claims, 4 Drawing Figures

FIXTURE FOR USE IN FORMING CYLINDRICAL SURFACES OF ACCURATE DIMENSION

DESCRIPTION

Technical Field

This invention relates to apparatus for forming cylindrical surfaces of accurate dimensions on a workpiece.

The concepts were developed for grinding and polishing right circular, cylindrical surfaces of large radii for mirrors of laser systems, and have particularly wide applicability to the fabrication of mirrors and lenses generally within the optic field.

BACKGROUND ART

Representative prior art apparatus directed to the grinding of curved surfaces is illustrated in U.S. Pat. Nos. 2,320,672 to Stein entitled "Machine for Grinding Curved Surfaces"; 4,038,783 to Rosenthal entitled "Method and Apparatus for Generating Optic Lenses"; and 4,135,333 to Stith entitled "Apparatus for Grinding a Cylindrical Optic Lens". Additionally, at least one prior art technique for grinding concave surfaces is known to include the drawing of a tilted wheel over the workpiece.

Notwithstanding techniques of the type described above, manufacturers of optical lenses and mirrors continue to search for apparatus capable of generating accurately contoured cylindrical shapes.

DISCLOSURE OF INVENTION

According to the present invention a workpiece into which a cylindrical surface is to be formed is rotatable through a circular arc on a movable template having a spherical surface which slides over an inversely contoured spherical surface on a fixed template.

A primary feature of the present invention is the opposing spherical surfaces of the fixed template and movable template. Significantly, the spherical surfaces are restricted to a two dimensional freedom of movement by an interlocking key and slot such that the movable template is manipulatable through an accurate circular arc. In one detailed embodiment a lattice of intersecting channels in one of the spherical surfaces is provided to make accuracy of the apparatus insensitive to dirt and other particles inherent in the grinding process environment.

A principal advantage of the present invention is the ability of the fixture to rotate a workpiece in which a cylindrical surface is to be formed through a circular arc of extremely accurate dimension. The invention is particularly advantageous where surfaces of large radius are to be formed. Representatively, accurate surfaces as large as three (3) feet in radius or greater can be effectively formed.

The foregoing, and other features and advantages of the present invention, will become more apparent in the light of the following description and accompanying drawing.

BEST MODE FOR CARRYING OUT THE INVENTION

Figure 1:
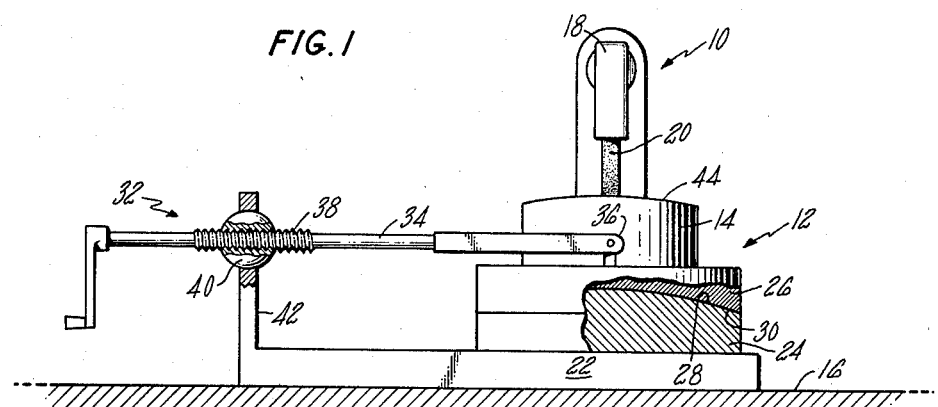
FIG. 1 is a simplified front elevation view of apparatus incorporating the concepts of the present invention for forming a convex cylindrical surface.

Apparatus constructed in accordance with the concepts of the present invention is illustrated in FIG. 1. The apparatus includes a grinding machine 10 and a fixture 12 for positioning a workpiece 14 to be contoured. The grinding machine has a worktable 16 and a traversing head 18 suspended above the worktable. A rotatable grinding wheel 20 is mounted in the traversing head.

The fixture 12 has a base plate 22 which is mountable in known location and angular relationship with respect to the grinding wheel 20. A fixed template member 24 is attached to the base plate and a movable template, member 26, is slideable thereover. The fixed template has a convex spherical surface 28 over which the movable template slides and the movable template has a concave surface 30 which opposes the convex surface of the fixed template. The workpiece 14 rests atop the movable template and is secured thereto.

A drive mechanism 32 is provided for varying the position of the movable template 26 with respect to the grinding wheel 20. As illustrated the drive mechanism includes an actuating arm 34 affixed at one end 36 to the movable template. The mid-portion 38 of the actuating arm is screw threaded and extends through a nut 40 mounted by known ball-joint type techniques in a support bracket 42 which extends upwardly from the base plate 22. The end 36 is hingedly attached to the movable template to enable smooth transitioning of the movable template across the fixed template. Types of drive mechanisms other than that illustrated may, of course, be effectively employed.

Figure 2:
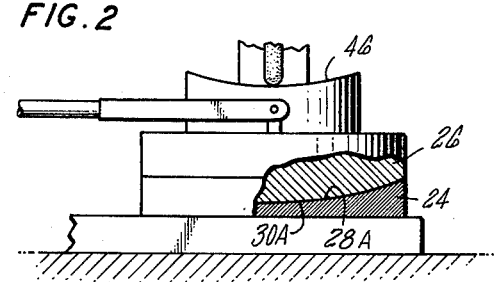
FIG. 2 is a simplified view corresponding to the FIG. 1 view, but showing apparatus for forming a concave cylindrical surface.
Figure 3:
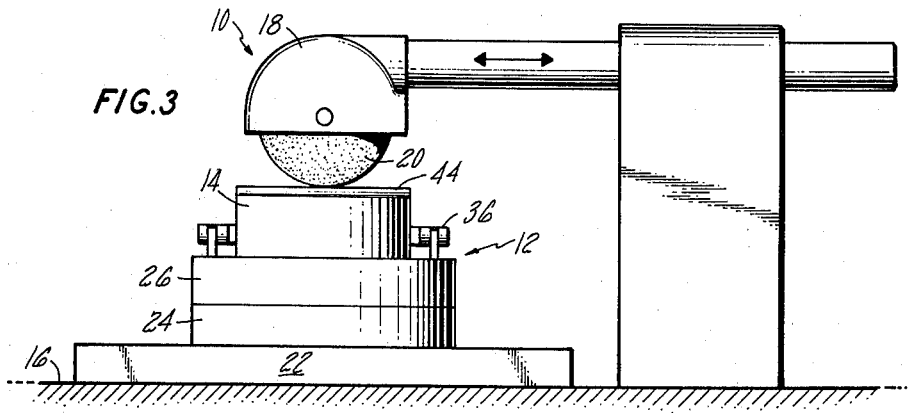
FIG. 3 is a simplified side elevation view of the apparatus of FIG. 1.

The fixture 12 of FIG. 1 is adapted for the grinding of a convex cylindrical surface, such as the surface 44 illustrated. An alternate embodiment of the fixture is illustrated in FIG. 2 and is adapted for the grinding of a concave cylindrical surface, such as the surface 46 shown. In reverse of the fixture of FIG. 1, the fixed template member 24 in the FIG. 2 fixture has a concave spherical surface 28A and the movable template member 26 has a convex spherical surface 30A. The remaining components may be identical. A side view of the apparatus is illustrated in FIG. 3 showing the grinding wheel 20 extending downwardly from the traversing head 18 into operation relationship with the workpiece 14.

Figure 4:
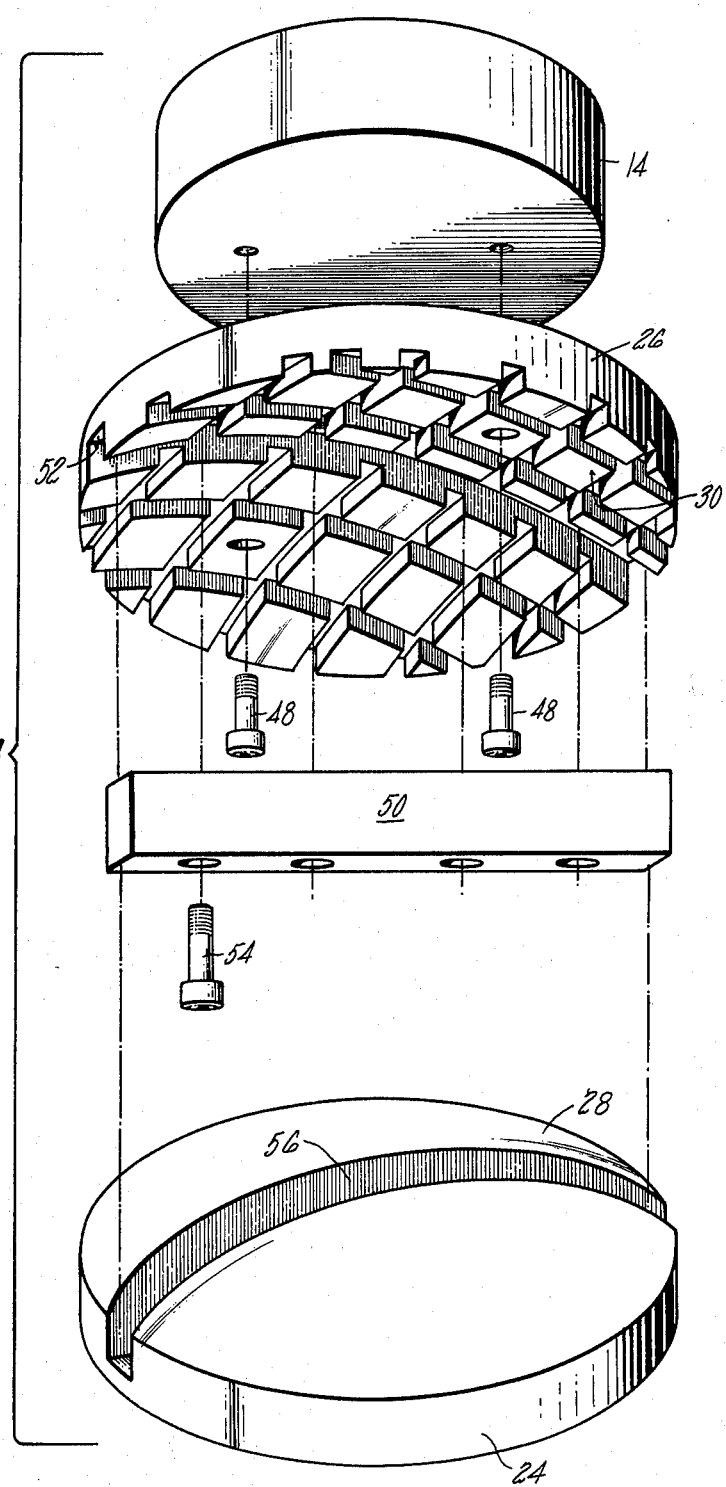
FIG. 4 is an exploded view showing the spherical surfaces and keyway of a fixture constructed in accordance with the concepts of the present invention.

FIG. 4 is an exploded view of the fixture 12. The workpiece 14 is fixedly secured to the movable template 26 such as by the screws 48. The spherical surface 28 of the fixed template member 24 and the mating spherical surface 30 of the movable template member 26 are shown. A bar shaped key 50 extends downwardly from a groove 52 in the spherical surface of the movable template member. The key is attached to the movable template such as by the screws 54. The key extends well below the spherical surface 30 of the movable template into sliding engagement with a key slot 56 in the spherical surface 28 of the fixed template member. The key and slot are oriented precisely perpendicularly to the direction of movement of the traversing head 18.

Further illustrated in FIG. 4 is a lattice of intersecting channels 54 in the concave surface 30. The channels are provided to make operative accuracy of the fixture insensitive to dirt or other particles inherent in a grinding process environment. Particles trapped between the surfaces become dislodged into the channels rather than causing separation of the spherical surfaces. Maintenance of a highly accurate path of travel results.

In operation of the apparatus a workpiece, such as the workpiece 14 illustrated, is secured to the movable template member 26. The movable template is integrated with and attached within the fixture 12. The fixture is mounted on the base plate 22 in an orientation such that the key and slot are perpendicular to the direction of travel of the head 18. It is recognizable then that the degree of movement of the movable template and workpiece secured thereto, is restricted to circular arc which is in a plane perpendicular to the direction of travel of the head. The head 18 is moved in repeatedly traversing strokes across the workpiece, causing the grinding wheel to remove material from the workpiece. The movable template is repositioned in incremental steps until the desired amount of material is removed and the cylindrical surface is formed.

A grinding process has been described although the concepts are equally applicable to polishing and other operations as well. Note additionally, in comparison of the FIG. 1 and FIG. 2 views, that the geometry of the grinding wheel 20 may be varied depending upon the contour of the surface to be formed. In dressing the grinding wheel to the desired geometry, practitioners may utilize the fixture for passing the dressing tool across the wheel.

It is very significant that the opposing surfaces of the movable and fixed templates are spherical rather than cylindrical. Those skilled in the art will undoubtedly question the need of spherical rather than cylindrical template surfaces inasmuch as the end product is to be of cylindrical geometry. The complexity may appear unwarranted. It has been determined, however, that for at least large diameter surfaces, spherical geometries can be economically produced to very accurate dimension. In fact such accurate spherical surfaces may be more economical to produce than cylindrical surfaces of correspondingly accurate contour. Nevertheless, it is the accuracy of the template geometry in the hereinafter claimed structure which makes the concepts of the present invention attractive.

In testing the concepts of the present invention, a cylindrical surface having a radius of curvature of thirty-four and one-hundred thirty thousandths of an inch (34.130 inches) was proposed and manufactured. Measurements of the surface showed an average radius of curvature of thirty-four and one hundred thirty-two thousands of an inch (34.132 inches). In the axial direction seven (7) measurements were made with the largest departure (of the cylindrical surface axis) from the mean being three ten thousandths of an inch (0.0003 inches).

Although the invention has been shown and described with respect to detailed embodiments thereof, it should be understood by those skilled in the art that various changes and omissions in form and detail may be made therein without departing from the spirit and the scope of the invention.

We claim:

1. A fixture for manipulating a workpiece through a circular arc, comprising:
    a movable template having a spherical surface and to which a workpiece is securable;
    a fixed template having a spherical surface of inverse geometry to the spherical surface of the movable template in opposing relationship thereto, and over which the spherical surface of the movable template is slideable;
    means restricing relative movement between said fixed and movable templates to a circular arc including a slot in one of said opposing spherical surfaces and a key extending from the other of said opposing spherical surfaces into the slot; and
    means for varying the relative positions of said fixed and movable template along said circular arc wherein one of said spherical surfaces has a lattice of intersecting channels formed therein.

2. The fixture of claim 1 wherein said spherical surface of the movable template has a concave geometry and wherein the opposing spherical surface of the fixed template has a convex geometry.

3. The fixture of claim 1 wherein said spherical surface of the movable template has a convex geometry and wherein the opposing spherical surface of the fixed template has a concave geometry.

4. Apparatus for forming a cylindrical surface on a workpiece, comprising:
    a grinding machine having a base plate and a traversing head including a grinding wheel mounted thereon;
    a fixture for manipulating the workpiece through a circular arc which is perpendicular to the direction of travel of the traversing head, including
    a movable template having a spherical surface and to which the workpiece is securable,
    a fixed template having a spherical surface of inverse geometry to the spherical surface of the movable template in opposing relationship thereto, and over which the spherical surface of the movable template is slidable,
    means restricting relative movement between said fixed and movable templates to a circular arc which is perpendicular to the direction of travel of the traversing head; and
    means for traversing the grinding wheel in said head across the workpiece and means for incrementally moving said workpiece on the movable template across the path of the traversing head to form a cylindrical surface on the workpiece
    wherein one of said spherical surfaces has a lattice of intersecting channels formed therein.

* * * * *